Nov. 2, 1954
F. RECINIELLO
2,693,054
METHOD FOR THE REMOVAL OF GLASS STRAINS
ON AUTOMATIC SEALING MACHINES
Filed April 21, 1952
2 Sheets-Sheet 1
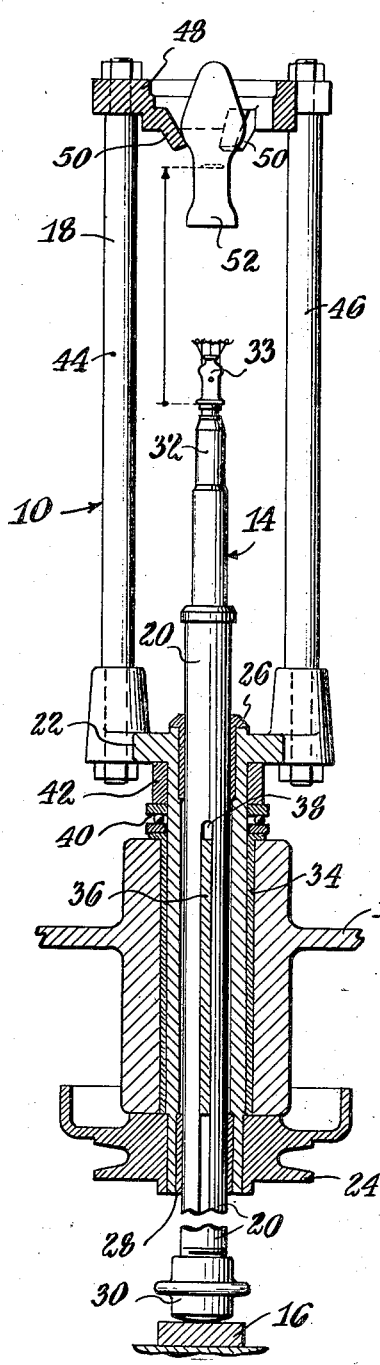
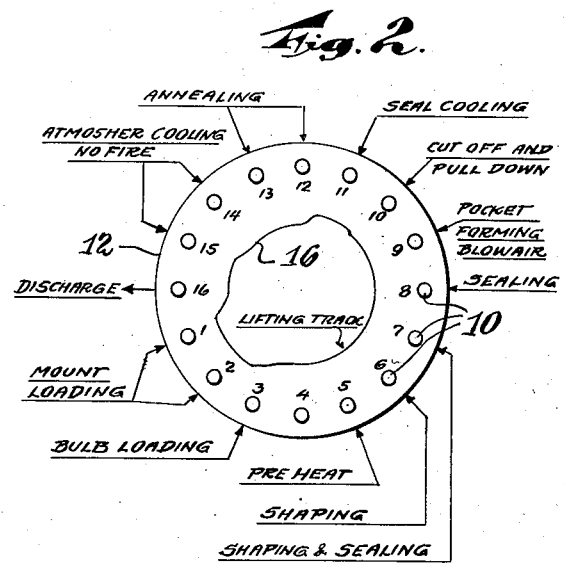
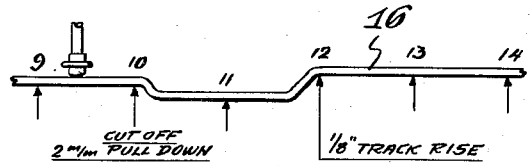
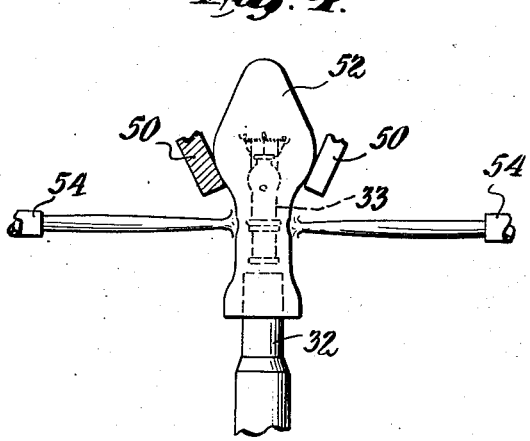
INVENTOR
FRANK RECINIELLO.
BY
ATTORNEY Nov. 2, 1954                F. RECINIELLO                 2,693,054
           METHOD FOR THE REMOVAL OF GLASS STRAINS
                ON AUTOMATIC SEALING MACHINES
Filed April 21, 1952                              2 Sheets-Sheet 2

INVENTOR
FRANK RECINIELLO.
BY
ATTORNEY

United States Patent Office 2,693,054
Patented Nov. 2, 1954

2,693,054

METHOD FOR THE REMOVAL OF GLASS STRAINS ON AUTOMATIC SEALING MACHINES

Frank Reciniello, Newark, N. J., assignor to Westinghouse Electric Corporation, East Pittsburgh, Pa., a corporation of Pennsylvania Application April 21, 1952, Serial No. 283,507

1 Claim. (Cl. 49—78)

This invention relates to a method for sealing tubulation and lead-carrying mounts to bulbs of incandescent electric lamps, electronic tubes and the like and, more particularly, to a method for removal of strain from miniature lamp bulbs while on such machines.

In the present manufacture of incandescent electric lamps for example, a mult-head machine is employed for sealing the lamp mount into the glass envelope or bulb. The conventional machine comprises an indexing table or conveyor having a plurality of equi-spaced sealing heads or spindles mounted thereon, which are moved thereby and indexed through an equal number of stations by conventional driving means. Each head comprises a sealing pin shaft assembly rotatably mounted with respect to said table, and a sealing pin shaft assembly lifting cam track for elevating said sealing pin shaft assembly with respect to said support assembly.

In the conventional case a multi-head sealing machine may comprise, for example, 16 heads. The sealing pin shaft assembly is at the lowest point of vertical travel and the mounts are loaded at stations 1 and 2. Between station 2, the bulb loading station 3, and station 4 where the bulb and mount start to rotate, the sealing pin shaft assembly, and also the mount is gradually elevated by the cam track into sealing position with respect to the bulb. Except at the seal cooling station 11, mount and bulb and the sealing pin shaft assembly remain at this vertical elevation in all remaining stations which may be namely: the pre-heat station 5, shaping station 6, shaping and sealing station 7, sealing station 8, pocket forming station 9, cut-off and pull-down station 10, annealing stations 12 and 13, atmosphere cooling stations 14 and 15, and discharge station 16.

The most serious problem on the automatic sealing machine has been the removal of glass strain from the sealed lamp, between the time it leaves the cut-off and pull-down station 10 until it reaches the discharge station 16. Great care has been required in the past by the sealing machine attendant in controlling the annealing fires to minimize the formation of the bulb strain. In many instances cracked bulb shrinkage amounts to 20% of all sealing production, thereby necessitating expensive shelf life and 100% reinspection of the sealed lamps. Besides the excessive expense involved, this type of procedure is tedious and cumbersome in the high-speed manufacturing of such items as incandescent electric lamps.

It is believed that the cause of strain in the sealed lamp during the annealing and cooling period is the fact that the glass bulb is in intimate contact with the metal bulb holder, which keeps the annealing fires from the engaged glass areas. Due to the differences in the co-efficients of expansion and the heat conductivity of the materials, the metallic holder, which cools faster than the glass bulb, in turn cools the contact portion of the bulb faster than the remainder of the bulb and thus produces strained seals. Again in the annealing stations the metallic bulb holder heats the contact portion of the glass bulb faster than the remainder of the bulb, thus producing uneven heating and failing to properly relieve the strained condition of the bulb and seal.

In an effort to reduce strain, various types of contact fingers making point contact on the bulb were employed on the conventional bulb holders. However, this was unsuccessful because, in the case of short length bulbs, the contact points of the bulb holder are too close to the sealing zone and cause temperature variation between the glass bulb and the contact points so that the bulbs still remain strained.

Hence, it has been found advantageous, according to my invention, in order to properly anneal the sealed lamp at stations 12 and 13, in the example selected, to raise the lamp by means of the sealing pin shaft assembly cam track off the bulb holder assembly contact points and allow annealing fires to remove the strain from the sealed lamp in these positions. At annealing station 12 an annealing flame is directed at the sealing zone of the rotating sealed lamp. At annealing station 13 a second annealing fire properly anneals the upper portion of the sealed lamp thereby producing a strain-free sealed lamp. At station 14 the lamp ceases to rotate and the uniformly annealed envelope and seal is permitted to cool uniformly in the atmosphere while still held above its conventional support.

In its general aspect the present invention has the object of overcoming the aforementioned disadvantages of the prior art machines for sealing tubulation and lead-carrying mounts to the bulbs of evacuated electrical devices.

Specifically, an object of the present invention is the elimination of strain in lamps sealed on an automatic machine for sealing tubulation and lead-carrying mounts to the bulbs of evacuated electrical devices.

Still another object of the invention is to provide uniform annealing and cooling of the sealed lamp after cut-off and pull-down on an automatic machine for sealing tubulation and lead-carrying mounts to the bulbs of evacuated electrical devices.

Other objects and advantages of my invention will appear to those skilled in the art to which it appertains as the description proceeds, both by direct recitation thereof and by implication of the context.

Referring to the accompanying drawings, in which like numerals of reference indicate similar parts throughout the several views:

Fig. 1 is an elevational view of an automatic sealing machine head at bulb loading station 3.

Fig. 2 is a diagrammatic plan view of an automatic machine for sealing tubulation, and lead-carrying mounts to the bulbs of evacuated electrical devices, showing the relative position of the sealing head spindle lifting cam track from station to station around said machine, radial distances to said track from the circumference of the diagram representing relative track elevations.

Fig. 3 is a side elevational view of the sealing head spindle cam track of my invention, showing the means for raising the sealed lamp off the bulb holder contact points at the annealing stations 12, 13 and 14.

Fig. 4 is a side elevational view of a lamp bulb and mount properly aligned for sealing at rotating pre-heat station 5.

Figure 5:
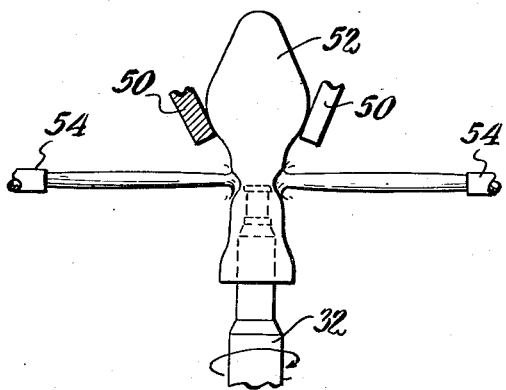
Fig. 5 is a view, similar to Fig. 4, at pocket-forming station 9 and cut-off and pull-down station 10.

Referring to the drawing in detail, and particularly to Fig. 1, a sealing head or spindle for a machine for sealing tubulation and lead-carrying mounts to bulbs of evacuated electrical devices, such as incandescent lamps, electronic tubes, and the like, is designated by the reference numeral 10. Each of the sealing heads 10 (in the showing of Fig. 2, 16 in number) is mounted on an indexing table or conveyor 12, moved thereby, and indexed through the 16 stations by conventional automatic indexing means (not shown). Each head comprises a sealing pin shaft assembly 14, rotatably mounted with respect to said table 12, and vertically reciprocated with respect thereto by means of a sealing pin shaft assembly cam track 16; and a bulb holder assembly 18.

Sealing pin shaft assembly

This sealing pin shaft assembly 14 as shown in Fig. 1, comprises a rotatable slidable sealing shaft 20, and means for rotating the head 10, such as a pulley 24 affixed to the lower end of a bulb holder journal 22. This hollow shaft 20 is slidable within an upper bushing 26 and lower bushing 28 in the journal 22. Affixed to the bottom extremity of the shaft 20 is a hardened cap 30 slidable on the cam track 16. On the upper extremity of the shaft 20 is mounted a hollow sealing pin 32, for receiving the leads and tubulation of a mount 33.

This journal 22, shown in Fig. 1, rotates in a bushing 34, in the table 12. A vertical key 36 extends from the journal 22 into a key-way 38 of the shaft 20, so that said shaft rotates as a unit with the journal 22. Vertical motion of the journal 22 with respect to the table 12 is prevented by a thrust ball bearing 40 thereabout between table 12 and a collar 42 thereof, and the pulley 24 on the bottom portion of the journal 22.

Bulb holder assembly

The bulb holder assembly 18 comprises a pair of rods 44 and 46, the lower ends of which extend from sockets at the top of the journal 22. A bulb holder 48 is secured to the upper extremities of said rods. Said holder has a plurality of bulb holder fingers 50 disposed in circumferentially-spaced arrangement and shaped to supportingly engage a bulb 52.

Cam track

The cam track 16 for lifting sealing pin shaft assembly 14, as shown in Figs. 2 and 3 has its lowest point at the mount loading stations 1 and 2 so that, as exemplified in Fig. 1, the leads and tubulation of a mount 33 can be readily inserted into the hollow sealing pin 32 without the fragile filament of said mount striking the bulb holder 48. Between stations 2 and 4, the elevation of the track is gradually increased so that the bulb 52 and the mount 33 are brought together for sealing.

The cam track remains at this elevation (Fig. 2) through the pre-heat station 5, shaping station 6, shaping and sealing station 7, sealing station 8, pocket-forming station 9 and cut-off and pull-down station 10. As the sealing pin shaft assembly 20 indexes from station 10, to the seal cooling station 11, a suitable depression in the cam track 16 approximately 2 mm., shown in detail in Fig. 3, pulls down the plastic sealed area of the lamp.

Between station 11 and the first annealing station 12, the cam track rises a suitable distance, such as ⅛″ in the example shown, to lift the sealed lamp off the bulb holder fingers 50. The cam track, and hence the sealed lamp, remains at this elevation with respect to the bulb holder 48 at the remaining annealing station 13 and cooling station 14. Between stations 14 and 15, the cam track is lowered to the normal sealing position of stations 5 through 10 and the sealed lamp again rests on the bulb holder fingers 50. Between discharge station 16 and mount loading station 1, the cam track is further lowered to the required mount loading elevation.

Operation

A mount 33 is loaded at either station 1 or station 2, a bulb 52 is inserted into the bulb holder 48 at station 3, and mount and bulb brought together and rotated at station 4. After pre-heat, shaping and sealing, at stations 5, through 8, by sealing fires 54, such as are shown in Fig. 4, lamp and mount are further heated by said fires at station 9 (Fig. 5) and air is blown through said hollow sealing pin shaft 20, by means not shown, to prevent collapse of the now receding bulb cullet onto the sealing pin 32.

Figure 6:
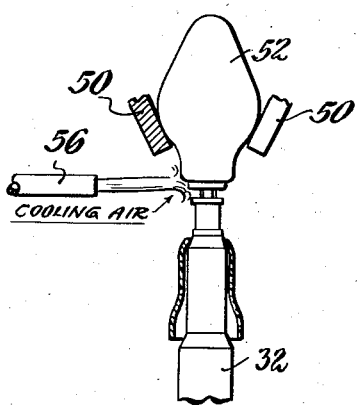
Fig. 6 is a view similar to Fig. 5, at seal cooling station 11, showing how jets of cold air are directed against the sealing zone of a sealed lamp.
Figure 7:
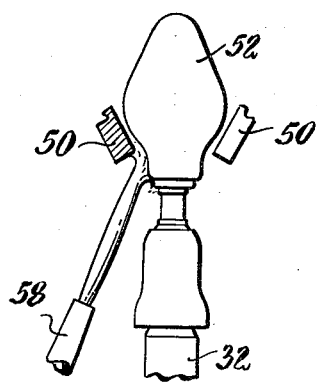
Fig. 7 is a view, similar to Fig. 6, of a sealed lamp at annealing station 12, showing the bulb raised off the bulb holder and an annealing fire directed against the sealing zone of the rotating sealed lamp.

At station 10, the cullet is cut off from the sealed lamp, and drops to the position shown in Fig. 6. Cooling air, from a jet 56, is directed onto the sealing area at station 11 to rapidly cool it from the incandescent sealing temperatures to a relatively cooler temperature, as also shown in Fig. 6. On indexing to the first annealing station 12, the sealed lamp is raised off the bulb holder fingers 50, as explained before, and an annealing fire 58, such as the fishtail burner shown in Fig. 7, is directed against the sealing portion of the revolving sealed lamp to properly reheat said area to the annealing temperature.

Figure 8:
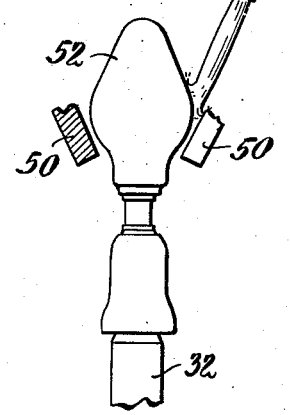
Fig. 8 is a view, similar to Fig. 7, of a sealed lamp at annealing station 13, showing an annealing fire directed against the upper portion of the rotating sealed lamp.
Figure 9:
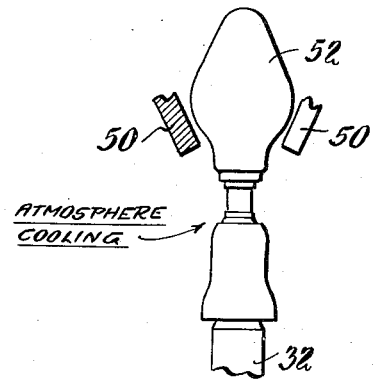
Fig. 9 is a view, similar to Fig. 8 of a sealed lamp at atmosphere cooling station 14.
Figure 10:
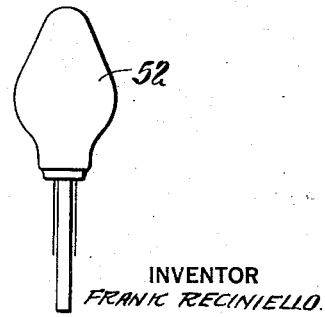
Fig. 10 is a side elevational view of a sealed lamp freed from strain, in accordance with my invention, and ready for exhaust.

At the second annealing station 13, shown in Fig. 8, a second annealing fire 60 reheats the remainder of the sealed envelope to a uniform annealing temperature throughout thereby removing any inherent strain in the sealed lamp envelope. At the cooling station 14, the sealed lamp is allowed to cool uniformly in the atmosphere, from the annealing temperature reached at station 13 to a temperature well below the strain point of the glass, forming the lamp envelope. As explained before, the lamp is lowered onto the bulb fingers 50 and then further cooled by the atmosphere at station 15 and discharged as by automatic transfer means (not shown) at station 16, as a sealed lamp free from shrinkage-causing strains and ready for exhaust, as shown in Fig. 10.

Thus, it will be understood from the foregoing description that my machine has overcome the aforementioned disadvantages of the prior art machines by sealing tubulation and lead-carrying mounts 33 to the bulbs 52 of the evacuated electrical devices. I have eliminated strain in such devices as they are sealed on these aforementioned automatic machines. I have provided means at the annealing stations for raising the sealed lamps from contact with the bulb holders 48 of the sealing spindles 10.

Uniform annealing and cooling of the sealed lamp after cut-off and pull-down on the automatic machine have been provided. The sealed lamps are raised by the lifting cam track 16 to permit the annealing fires to uniformly heat the entire lamp envelope and properly remove any inherent strain.

Although an embodiment of my invention has been disclosed, it will be understood that modifications may occur to those skilled in the art.

I claim:

Method for the removal of glass strains from incandescent lamp bulbs on an automatic sealing machine comprising sealing a tubulation and lead carrying mount while supported on a bulb holder of said machine to said bulb, rapidly cooling the seal below the annealing temperature to solidify said seal, raising said bulb from contact with said bulb holder, uniformly reheating said bulb to the annealing temperature while so raised, and cooling the bulb to a temperature well below the strain point of the glass of the bulb.

References Cited in the file of this patent

UNITED STATES PATENTS

| Number | Name | Date |
| --- | --- | --- |
| 1,655,140 | Fagan | Jan. 3, 1928 |
| 2,195,483 | Franke | Apr. 2, 1940 |
| 2,237,186 | Malloy | Apr. 1, 1941 |
| 2,413,960 | Eisler | Jan. 7, 1947 |
| 2,518,924 | Niles | Aug. 15, 1950 |